May 27, 1969　　　H. D. LESHER ET AL　　　3,446,099
ADAPTIVE CONTROL FOR A MACHINE TOOL
Filed May 13, 1963　　　　　　　　　　　　Sheet 1 of 6

INVENTORS
HOWARD D. LESHER
ROBERT FRIEDMAN
JOSEPH O. FOREMAN
BY
Sidney Magnell
AGENT

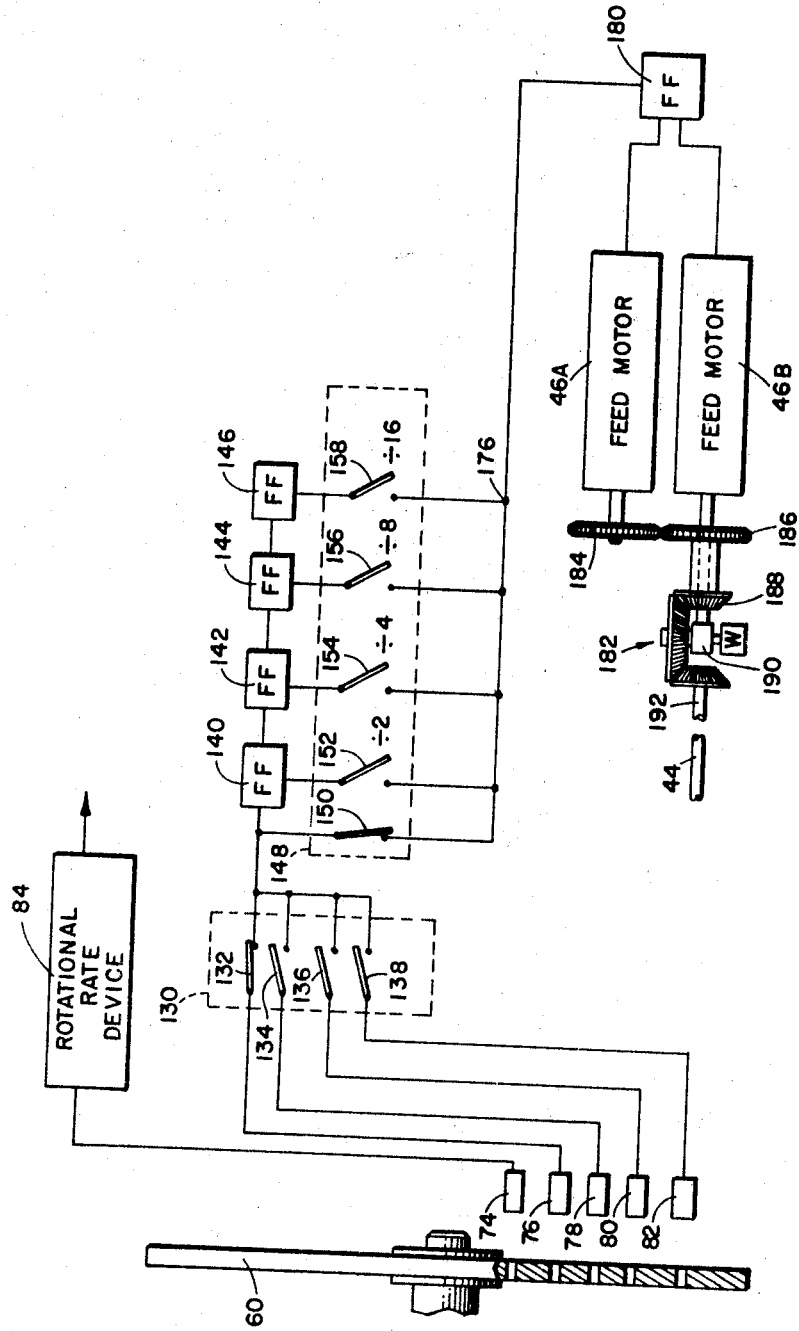

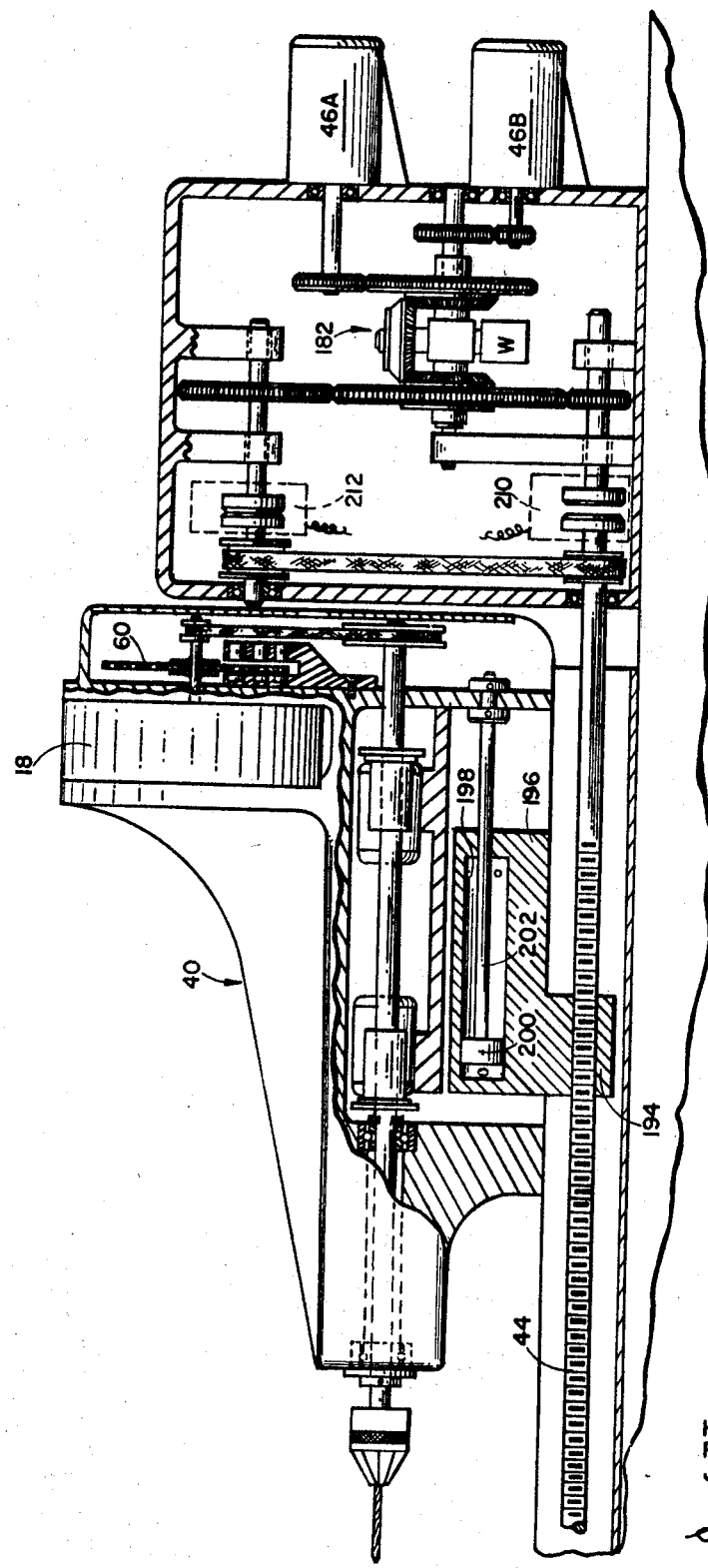

United States Patent Office 3,446,099
Patented May 27, 1969

3,446,099
ADAPTIVE CONTROL FOR A MACHINE TOOL
Howard D. Lesher, Canoga Park, Robert Friedman, Reseda, and Joseph O. Foreman, Chatsworth, Calif., assignors to North American Rockwell Corporation, a corporation of Delaware
Filed May 13, 1963, Ser. No. 279,800
Int. Cl. B23d 39/08, 39/10
U.S. Cl. 77—32.4          36 Claims This invention relates to a machine tool; and more particularly to a machine tool for cutting or drilling materials.

BACKGROUND

Modern industry requires many precisely positioned holes, particularly holes of small diameter.

For example, in many new engines the fuel is squirted into the combustion chamber through a plurality of very fine holes that are oriented to cause the streams of fuel to converge at a given point. As another example, many manufacturing processes use a so-called "extrusion die," which has a very fine hole through which is forced materials such as glass, nylon, and the like; so that the emergent material forms a very thin, continuous filament. In other processes, wires are pulled through very fine holes, in order to reduce the wire diameter. A newly designed medical instrument for hypodermic injections does not use the familiar hollow needle, but instead causes the medication to squirt through a very fine hole with such a high velocity that the stream of medication penetrates the skin of the patient.

While the above illustrations require fine holes, other applications require large holes or machined surfaces; and in many cases new, exotic, high-strength materials are used.

The forming of such holes or machined surfaces is accomplished by cutting tools such as drills, milling tools, and the like; these tools being rotated and fed forward so that their cutting edges advance into a workpiece, and "bite out" chips of the material.

The use of the new high-strength metals greatly increases the danger of tool-breakage, which is not only a costly time-consuming nuisance, but also introduces the probability that the broken portion of the tool will remain jammed in the partly drilled hole. The jammed, broken tool poses the difficult problem of removal, or the alternative of discarding a workpiece that may be close to its finished state.

The high-strength materials, in addition to introducing the problem of tool breakage, also introduce the problem of more-rapid dulling of the tool's cutting edges.

Furthermore, since machine-time is expensive, it is desirable that the cutting operation have minimal problems due to tool-breakage, tool-dulling, low-efficiency cutting, tool-sharpening, etc.

It therefore becomes increasingly necessary to precisely control the rate at which the tool is being rotated and fed into the workpiece.

Ordinarily a drill may be expected to form a hole that is about seven times as deep as the diameter of the drill. Modern design, however, frequently requires extremely fine holes; requires holes whose depths are between 100 to 150 times the diameter of the drill; and requires holes drilled in extremely hard materials.

The use of the disclosed device has produced drilled holes as small as eight one-thousandths of an inch in diameter (about the diameter of a human hair); with a depth as much as 100 times the drill diameter; and has drilled these holes in materials having a hardness number as high as 42 on the Rockwell "C" scale. Furthermore, these holes have been drilled with practically no drill breakage.

INTRODUCTION

In drilling a hole, a motor turns the shank end of the drill; while a feed-mechanism causes the drill to move forward in a predetermined manner. As the cutting edges of the drill bite into the workpiece, the material of the workpiece offers a resistance. If the resistance is relatively low, and/or if the drill is extremely strong, the drill does not suffer any twisting. Its cutting efficiency under these conditions is quite low compared to its actual capability.

In order to drill at a higher cutting efficiency, the drill is rotated faster, and is advanced into the workpiece at a faster rate—so that the drill's cutting edges bite more deeply into the material. Under these conditions, the resistance at the cutting edges of the tool increases; and therefore the working end of the drill assumes a twist as compared with its shank end. This twist will be designated as the "tool load."

For maximum cutting efficiency the tool load should be as great as possible, without breaking the drill; as under these conditions the most metal is removed in the shortest possible time.

The breaking point of the drill is either supplied by its manufacturer, or can be obtained experimentally; but unfortunately, until now there was no way of knowingly operating the drill just below its breaking point.

Many attempts have been made to achieve this result. Some of them measured the current taken by the motor; but unfortunately this measurement is more characteristic of the motor than of the tool load. Another approach was to measure the "thrust," that is the pressure between the working end of the drill and the material into which it was drilling; but this thrust unfortunately did not have a fixed relation to the tool load.

The problem of "chip removal" is another serious problem faced in the drilling of materials. Most drills have one or more channel-like "flutes" that start at the cutting edges, and extend helically along the shaft of the drill toward the shank end. The function of these flutes is to conduct the chips from the cutting edges to a point above the surface of the workpiece, so that the chips may be discarded above the surface of the material being cut.

Unfortunately, in very fine drills, if the flutes extend more than an eight of an inch or so, they weaken the drill to such an extent that under cutting action the drill tends to unwind like a helical spring. This, of course, reduces the cutting efficiency. The flutes are therefore quite short; and as a result are incapable of discharging the chips from even a moderately deep hole. As a result, the chips tend to pack into the flutes, and increase the tool load. Therefore, in drilling almost any depth hole, the drill must be withdrawn repeatedly in order to permit the chips to be dislodged from the flutes.

It is obvious that if the drill is withdrawn too frequently and unnecessary, the effective cutting time decreases; whereas if the drill is not withdrawn at the proper time, the packing action of the chips may cause the drill to break.

In the past there was no really satisfactory way of determining when the drill should be withdrawn for chip removal. Some devices withdrew the drill periodically, and then reinserted it; an operation known as "pecking." This, of course, is inefficient. Other devices used the aforementioned thrust and motor current concepts to control the intervals at which the drill was withdrawn.

None of these approaches achieved optimum cutting efficiency and minimum tool breakage.

Another problem in drilling is that of controlling the rate at which the drill advances, or "feeds," into the material being drilled. If for example, the drill feeds forward at too slow a rate, the cutting efficiency will be low, and the drill's cutting edges tend to rub, rather than cut; thus producing friction and heat, which in many cases, causes "work hardening" or "heat hardening" of the material, thus making drilling even more difficult. If, on the other hand, the drill is fed forward at too high a rate, it will tend to bite too deeply into the material, and the drill will therefore be prone to breakage.

In using very small diameter drills, which are particularly susceptible to breakage, it is essential that the drill's feed rate be correlated very closely with the drill's rotational rate.

Most prior-art interconnections between the drill's rotational mechanism and the drill's feed mechanism used gears, which unfortunately had a high inertia. When it became necessary to decelerate, or to stop the drilling action, the inertia was so large that the drill frequently broke before the drilling action could be changed.

OBJECTS AND DRAWINGS

It is therefore the principal object of this invention to provide an improved machine tool.

The attainment of this object, and others, will be realized from the following specification, taken in conjunction with the drawings, of which FIGURE 1 shows the basic tool load control arrangement;

FIGURE 6 shows exemplary circuitry for controlling the tool feed;

FIGURE 8 shows an overall, partly cross-sectional view of the apparatus.

SYNOPSIS

Broadly stated, the present invention contemplates measuring the instantaneous tool load, and adapting the tool's rotational rate in accordance therewith. The present invention also contemplates chip relief by measuring the rotational speed of the tool, and—when the tool is slowed to a predetermined speed and decreased cutting efficiency by the binding effect of chips or some other cause—to withdraw the tool and permit it to dislodge the chips; whereupon the tool is reinserted. The present invention further contemplates a tool-feeding arrangement that is interconnected with the drill by means of electronic circuitry, so that there is no inertia; and the rotation and/or the longitudinal motion of the tool may therefore be changed or stopped practically instantaneously. Other ancillary features will be disclosed and explained.

DESCRIPTION OF THE INVENTION

Figure 1:
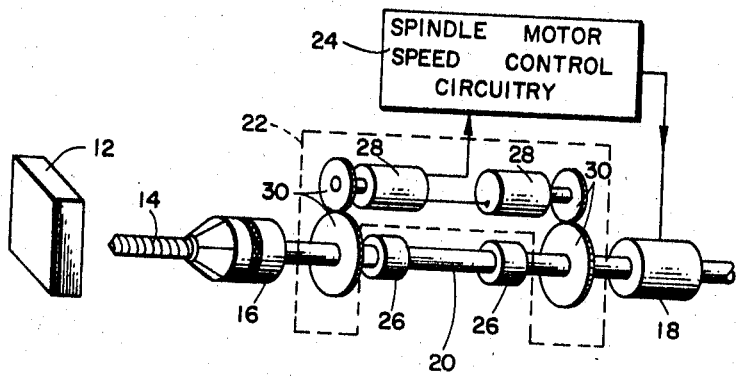

The instant invention may be understood from FIGURE 1. Here a workpiece 12 is to have a hole drilled in it by drill 14, which is held in a suitable collect or chuck 16, and is rotated by a "spindle" motor 18.

Drilling is achieved as follows. For simplicity of explanation, assume first that chuck 16 is rotating at a particular speed, and is applying a particular turning force or "torque" to the shank end of drill 14, which is advancing into workpiece 12 at a predetermined rate. The cutting edges of drill 14 are therefore biting into the material of the workpiece 12. As a result of the rotational force of chuck 16 and the resistance of the material to the cutting edges, drill 14 assumes a particular twisted condition called the tool load. It is this tool load which must be kept below the breaking point of the drill; and must still be kept high enough to achieve maximum cutting efficiency.

Tool-load control concept

While the actual tool load on the drill cannot be measured, it is approximated in the following manner. Between spindle motor 18 and drill 14 there is positioned a torsion rod or bar 20. Assume for ease of explanation, that torsion rod 20 is formed of the same material as drill 14, and is of the same length.

As spindle motor 18 rotates, it applies a torque to one end of torsion rod 20. The other end of torsion rod 20 therefore applies torque to chuck 16, which in turn applies a torque to the shank end of drill 14, whose cutting edges encounter the resistance of the material of the workpiece 12. Under this condition, drill 14 and torsion bar 20 are under "torsion," and are twisted exactly the same amount. Thus, while the tool load at the drill is actually unavailable, it is duplicated at the torsion rod 20, whose twisting can be precisely measured by a torsion transducer 22, which transduces the torsion into an electrical signal.

Various types of torsion transducers are described in Patent No. 2,586,540; and, generally speaking, these have elements connected to each end of the torsion bar, the elements moving relative to each other as the torsion bar twists. Torsion transducer 22 converts the amount of twist of torsion bar 20 into an electrical signal, which is applied to suitable spindle-motor speed-control circuitry 24. The output from circuitry 24 is a signal that, for convenience, will be designated as the spindle-motor speed-control signal; and is applied to spindle motor 18 to control the speed thereof.

The drilling operation is as follows. As the drill approaches the workpiece, it is rotating freely in the air at a relatively high speed. Under this condition, there is no tool load.

As the drill is advanced into the workpiece, at first only the central portion of the tool's cutting edges bite into the workpiece. Due to the small contact area, they encounter only a low resistance; and tool 14 and torsion bar 20 both assume the same slight twist. The slight twist introduced into torsion bar 20 is measured by torsion transducer 22; which produces a small signal that causes motor 18 to slow down slightly.

As the drill advances farther into the workpiece, a greater length of the drill's cutting edges engages the workpiece, and these now bite out larger chips. The increased resistance of the material of the workpiece causes an increased twist of drill 14 and torsion bar 20. The increased twist of torsion bar 20 causes torsion transducer 22 to produce a larger output signal that slows down motor 18 even more.

Eventually, when the full length of the cutting edges is engaged, the tool load becomes constant; and at that time the circuitry maintains a constant speed for the spindle motor 18.

Thus, the speed of drill 14 is decreased until its cutting edges bite into workpiece 12 at an optimum rate; this rate being high enough to provide optimum cutting efficiency, but being low enough to assure that the drill is kept below its permissible tool load.

It is well known that all materials have areas that are harder and softer than other areas, each area requiring an individual drilling rate.

These individual cutting rates are provided as follows. Assume that the cutting edges of drill 14 enter a soft area. Due to the decreased resistance, the twist experienced by drill 14 and torsion bar 20 is reduced. As a result the torsion transducer 22 produces a smaller output signal, corresponding to the reduced twisting of torsion bar 20. This smaller signal, when applied to the spindle motor 18, permits the motor to accelerate; in this way increasing the rotational speed of drill 14 to increase the tool load.

Thus, the rotational speed of the drill is increased when its cutting edges encounter soft spots; meanwhile maintaining the same tool load.

Assume now that the cutting edges of drill 14 encounter one of the harder spots of workpiece 12. As a result, the resistance to the movement to the cutting edges increases; applying an increased twist to drill 14 and torsion bar 20. The torsion transducer 22 senses the increased twist of torsion bar 20, and produces a larger output signal that slows the spindle motor 18, thus decreasing the tool load.

In this way the rotational rate of drill 14 is reduced when the cutting edges encounter a hard spot.

The invention thus maintains the speed of the drill at the highest possible cutting efficiency; but still operates the drill at a tool load just below that at which the drill would break.

Let us consider what happens as the cutting edges of the drill become duller.

With continuous use, the cutting edges of the drill become somewhat dulled. As a result, a greater resistance is presented by the material of workpiece 12; and this greater resistance causes a tendency for greater twisting of drill 14 and the torsion bar 20. The torsion transducer 22 senses this increased twist, and its still larger output signal slows spindle motor 18 even more.

It may thus be seen that as the drill becomes duller, the spindle motor is slowed, thus decreasing the tool load, so that the drill 14 is never stressed to its breaking point.

It should be noted however, that the cutting efficiency is maintained at its maximal value in view of the fact that the cutting edges are dulled.

It has been shown that this invention will adapt the drill's speed to maintain maximum cutting efficiency and minimal tool breakage regardless of the type of material, the presence of hard or soft spots, or the dulling of the cutting edges of the drill. It should be noted that this invention produces an indication of the instantaneous tool load, and maintains the instantaneous tool load below the permissible tool load to prevent tool breakage; while permitting a controlled variable rotational rate of the drill.

For ease of explanation, it was assumed that torsion bar 20 had exactly the same characteristics as twist drill 14; but this relationship is not essential. For example, the torsion bar may be much stiffer than the drill, whereupon it would twist less than the drill. In this case, the resultant smaller output signal from the torsion transducer may be caused to have a greater effect upon the spindle motor.

Conversely, if the torsion bar is relatively weak compared to the drill, it will experience more twisting than the drill; and the signal from the torque transducer 22 can have a smaller effect upon the speed of spindle motor 18.

It is preferable that torsion bar 20 be easily replaceable with others of different twist characteristics, in order to permit the use of a plurality of different sized drills having permissible tool loads. This easy replacement of torsion bar 20 is achieved by the use of suitable coupling members 26, which may comprise tongue-and-groove arrangements that permit easy insertion and removal of the torsion bar.

In order for the drill's speed to be precisely controlled, it is desirable that all the elements associated with it be designed to minimize inertia.

Spindle motor 18 is, therefore, preferably of the printed-wire type, as for example model 368 of Printed Motors, Inc., 33 Sea Cliff Ave., Glen Cove, N.Y.

For the same reason, the exemplary torsion transducer 22 comprises low-interia synchro motors 28, such as model R1011, Kearfott Division of General Precision, Inc., Little Falls, N.J., and lightweight spur gears 30; although a further-decreased inertia can be achieved by means of optical torsion-transducing means. In the operation of the exemplary torsion transducer, the two synchro motors 28 are geared to opposite ends of the torsion bar 20. When the torsion bar is not twisted, the output of the synchro motor arrangement produces a minimal signal. As the torsion bar twists under load, the synchro motors change their relationship, and the previously minimal signal increases in magnitude. The spindle-motor speed-control circuitry 24 senses the output signal from the synchro motor arrangement; and produces a corresponding spindle-motor speed-control signal.

As previously indicated, the permissible tool load depends upon the drill, its size, material, manufacturer, and other factors. In order to accommodate a range of drills, the spindle-motor speed control circuitry 24 has means (to be explained later) for presetting the desired tool load.

*Tool-feed control concept*

As indicated above, it is necessary that as the drill is rotated, it be fed forward into the workpiece.

Figure 2:
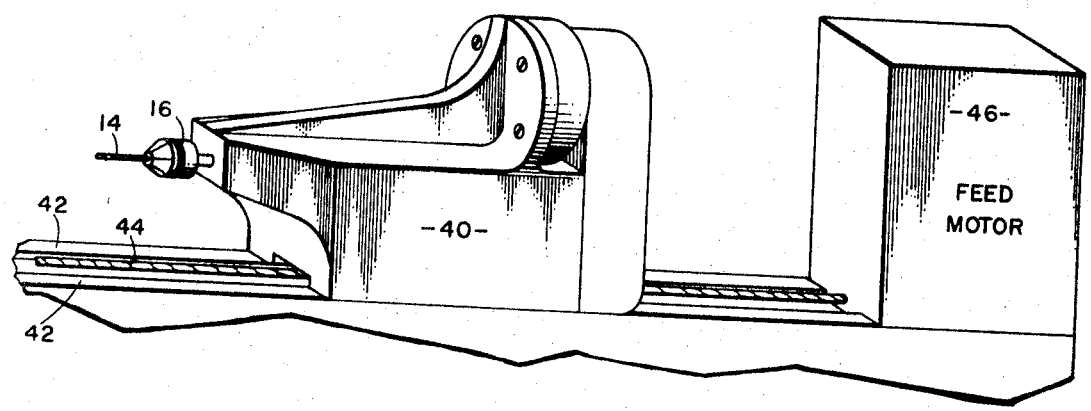
FIGURE 2 shows the basic tool-feeding arrangement.

To accomplish this result, the previously-described tool-load control mechanism—comprising the drill 14, chuck 16, spindle motor 18, torsion bar 20, torsion transducer 22, and other associated apparatus—is mounted, as shown in FIGURE 2, in a housing 40 that slides along so-called "ways" 42, toward and away from the workpiece. A portion of the housing engages a feed screw 44 in a manner to be described later; and a feed motor 46 rotates the feed screw, whose rotation advances or retracts the housing—thus moving the drill forward or backward with reference to the workpiece.

As may be realized, the cutting edges of the drill have particular angles that require the drill rotation and its rate of forward movement be closely correlated in order to obtain maximum cutting efficiency. For example, if the feed rate is too slow, the cutting edges of the drill, instead of biting properly into the workpiece, will bite relatively inefficiently; thus introducing friction, heat, and work-hardening some materials. If on the other hand, the feed rate is too high, the cutting edges will be forced into the workpiece at a rate that is higher than that for which they were designed. This will cause increased tool load and excessive dulling of the cutting edges.

It is therefore obvious that the feed rate must be closely correlated with the speed of the cutting tool.

In the past this correlation was provided by a series of gears that mechanically linked the rotation of the feed screw 44 to the rotation of the drill 14. Since different rates of feed are required for different drills and for different materials, the gearbox had to be variable. The structure for variable feed rates required a large number of gears, and mechanism for changing the gear ratios; and all of these added inertia.

As a result, the large inertia introduced by the large complex gearbox did not permit instantaneous changes of the feed rate or of the drill's speed. Thus, when it became necessary to instantaneously slow the drill—as for example when the drill encountered a hard spot—the inertia prevented instantaneous deceleration; and the drill would experience a sudden increase in tool load, and would break.

The present invention contemplates separate drill-rotation and drill-feeding motors, and electronic—rather than a mechanical—interconection between the drill and the feed mechanism. This concept permits a wide range of feed rates, and introduces a minimum of inertia.

Figure 3:
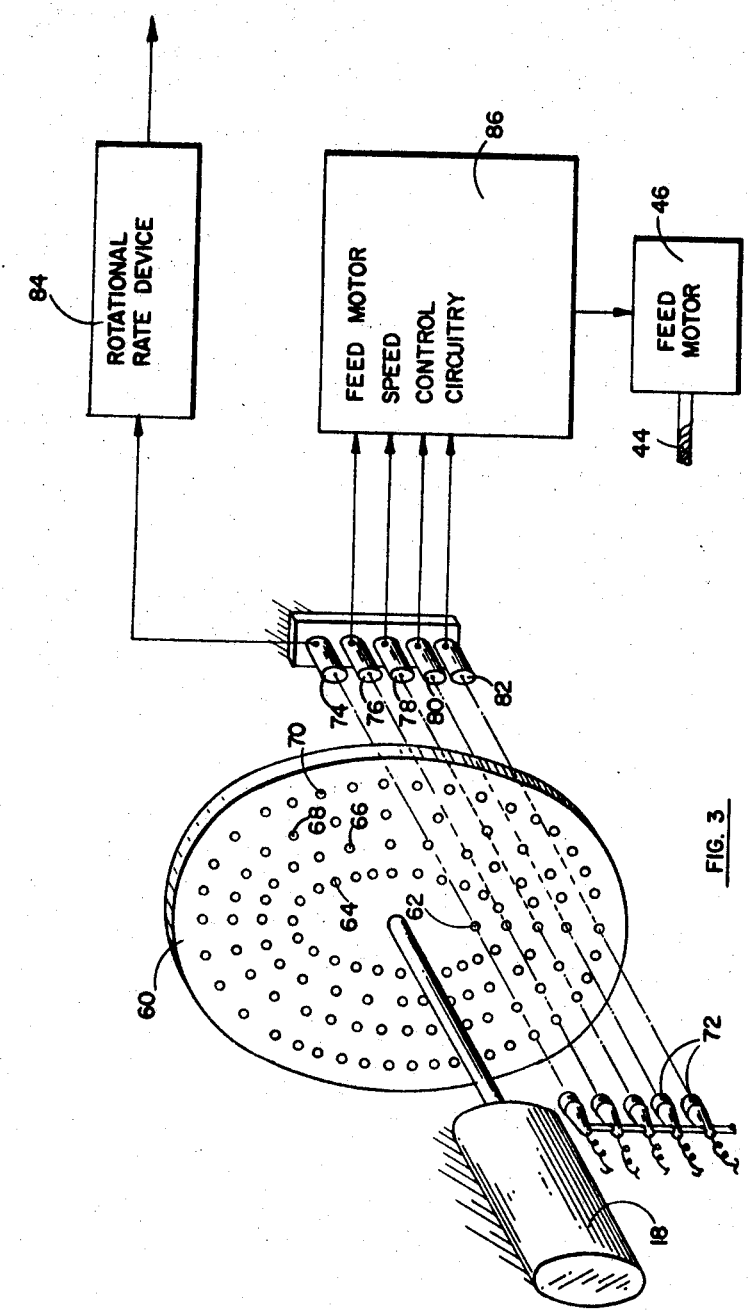
FIGURE 3 shows the basic tool-feed control arrangement.

This result is achieved as follows. FIGURE 3 shows a lightweight low-inertia chopper disc 60 attached to the drill-rotating mechanism in such a way that the disc 60 rotates with the drill. It has been found convenient to mount chopper disc 60 on the end of spindle motor 18, so that the chopper disc 60 and its associated equipment is within the previously described housing.

Chopper disc 60 has a series of concentric hole-circles; five such circles being illustrated and indicated by reference characters 62, 64, 66, 68, and 70. The number of holes in each hole-circle may be selected for its particular purpose; 1, 34, 40, 48, and 58 holes per circle being used for illustrative purposes—although of course, other numbers of holes can be used.

Light sources 72 are positioned on one side of chopper disc 60 in such a manner that the light is "chopped" by each hole-circle; alternatively, a composite light source may be used if desired.

A series of light detectors 74–82, which may be elements such as photocells, phototransistors, or the like, are positioned on the other side of chopper disc 60. Thus, as chopper disc 60 rotates, each light detector receives bursts of chopped light from a particular hole-circle; and produces a corresponding train of electrical signals, which may be pulses, sinusoidal waveforms, or waveforms of other shapes.

The innermost hole-circle 62 may be used for indicating the drill's speed. For example, if it has one hole, this means that one burst of chopped light reaches light detector 74 for each revolution of the drill. The output of light detector 74 is thus a direct indication of the speed of the drill; and its output may be used to actuate a rotational-rate device 84, such as a tachometer that indicates the speed of drill.

Device 84 produces an output signal, whose use will be explained later.

If desired, hole-circle 62 may have more than one hole, which arrangement would provide more accurate information about the drill's instantaneous speed, rather than its average speed.

The other four hole-circles are used to correlate the feed-rate of the drill with its speed. For example, light detector 76 produces thirty-four pulse-like electrical signals for each revolution of the drill. These pulses are fed to feed-motor speed-control circuitry 86, which will be described later in more detail. This circuitry controls the speed of feed-motor 46, and thus the rotational rate of the feed screw 44; which in turn controls the feed rate of the drill.

If a faster feed rate is desired, the signals from light detector 78 may be used. These occur forty times for each revolution of the chopper disc 60, whereas the signals from light detector 76 produced only thirty-four signals for each revolution of the drill. The use of these more frequent siganls from light detector 78 causes feed-motor 46 and the feed screw 44 to rotate at a slightly higher speed.

For still faster feed rate, the still more frequent output signals from light detectors 80 or 82 may be used.

It is thus apparent that the present invention provides an electronic inertialess, rather than a mechaincal high-inertia, itnerconnection between the drill-rotating mechanism and the drill-feeding mechanism.

As a result of the disclosed electronic interconnection, the drill-rotating mechanism is practically independent of the drill-feeding mechanism. If the torsion transducer provides a speedup or a slowdown signal to the spindle motor, the spindle motor can respond practically instantaneously. Similarly, if the feed mechanism is to be accelerated, decelerated, or reversed, it is also free to do so practically instantaneously.

In order to precisely control the feed mechanism, feed-drive motor is preferably of the "stepping" type, such as Slo-Syn model SS50–1002 produced by The Superior Electric Co. of Bristol, Conn. The operation of these motors is such that each pulse of electricity that is applied to the feed-drive stepping motor causes the feed motor to rotate through only a small given angle, or "step." For example, if the stepping motor is of the 200 pulse type, each pulse causes it to rotate $\frac{1}{200}$ of a revolution; that is, 200 pulses are necessary to cause the motor to make one revolution.

If, in the above example, the pulses from light detector 76 were being used, the thirty-four pulses per revolution of the drill would cause the feed drive motor to rotate a $\frac{34}{200}$ portion of a revolution for each revolution of the drill.

Similarly, use of the pulses from the other circle-holes would cause $\frac{40}{200}$, $\frac{48}{200}$, and $\frac{58}{200}$ revolutions of the feed-drive motor for each revolution of the drill. In this way, a single rotation of the chopper disc can cause different fractions of a rotation of the stepping-type feed motor.

While feed motor 46 does not rotate evenly, but rather advances in a series of small steps, the elasticity of the timing belt, the feed mechanism, and other factors, cause the drill to move smoothly forward and backward.

In order to provide even finer control of feed-motor 64, feed-motor control-circuit 86 contains circuitry (to be described later in detail) that divides the signals from the light detectors by factors of 2, 4, 8, and 16. Therefore, the number of pulses actually available for each revolution of the chopper disc are as shown in the following table.

|    | ÷2 | ÷4 | ÷8 | ÷16 |
|----|----|----|----|-----|
| 34 | 17 | 8  | 4  | 2   |
| 40 | 20 | 10 | 5  | 2.5 |
| 48 | 24 | 12 | 6  | 3   |
| 58 | 29 | 14 | 7  | 3.5 |

This pulse-number dividing arrangement provides a feed-rate range of about 30:1, the increments differing by about 20%. The wide range of feed rates permits the operator to select an optimum feed rate for the material being cut and for the design of the cutting tool; and has been found satisfactory for the range of drills and materials used. Of course, a different number of hole-circles, or hole-circles having a different number of holes, may be used to provide different rates for the feed motor.

In addition to the inertia-less coupling and the wide choice of feed rates, the invention still assures drill operation at maximum cutting efficiency, and minimal tool breakage. Moreover, the feed rate may be changed at any time, without interfering with the rotation of the drill.

The previous explanation indicated that a separate hole-circle, 62, is used for measuring the drill speed.

If desired, this hole circle can be eliminated, and the output from another hole-circle and light-detector used for activating the tachometer.

*Chip-relief control concept*

It was previously indicated that chips of material are produced as the cutting edges of the drill bite into the workpiece; and that these chips of material are carried out of the hole by the helical flutes of the drill.

If the flutes are long enough so that they extend above the surface of the workpiece, the chips move along the channel formed by the flutes, and are discharged outside of the workpiece. If however the hole becomes so deep that the flutes terminate below the surface of the workpiece, the chips cannot be discharged, and therefore tend to pack progressively more tightly into the flutes of the drill. The progressive packing of the chips in the flutes causes them to rub against the surface of the drilled hole, produce friction, and thus increase the loading of the drill.

As progressively more chips pack into the flutes of the drill, the drill progressively slows down, the resultant progressively decreasing drill speed causing a progressively lower cutting efficiency.

At a predetermined drill speed, when the cutting efficiency has dropped to an undesirable level, the present invention initiates a "chip-relief" action; although, under the condition described, the tool load has not necessarily increased to a dangerous level.

There is another condition when immediate chip relief becomes necessary. Frequently, depending on the material being drilled, the chips—due to the characteristic of the material—progressively fill the flutes without appreciably loading the drill. As progressively more chips accumulate in the flutes, they suddenly pack the flutes, and cause the drill to "bind" in the hole. Under this condition, tool-breakage is imminent; and immediate chip relief and deceleration of the tool's rotation are necessary.

The sudden cessation of the drill's rotation, due to the binding action, of course brings the rotational rate below the predetermined drill speed; whereupon chip-relief action is initiated.

As soon as the need for chip-relief action is indicated, the drill is immediately withdrawn from the hole; thus reducing the tool load, and preventing tool breakage. The reduced tool load causes the torsion transducer to produce a smaller output signal that permits the spindle motor to accelerate. The acceleration of the spindle motor accelerates the rotation of the drill; and centrifugal force causes the packed chips to fly out of the flutes.

As soon as the flutes have been cleared, the drill advances back into the hole, so that it may resume drilling at its maximum efficiency.

It should be noted that the present invention provides chip-relief only when the drill's cutting efficiency, as measured by its speed, drops below a predetermined level; rather than at some irrelevant "pecking" rate, or at times primarily determined by motor current or thrust. In actuality, chip relief—comprising withdrawal and reinsertion occurs only when necessary; and thus maximizes the machine's operating time.

The chip-relief feature of the invention offers an additional advantage.

Assume that the drill has become excessively dull. As a result, the cutting edges encounter a high resistance, and the resultant high tool load twists the torsion bar to a great extent. The effect is to produce a torsion transducer signal that greatly slows the spindle motor. As the spindle motor and the drill slow down, the drill's speed falls below the acceptable cutting efficiency; and chip-relief operation is initiated—even though chip relief is not really necessary.

When the drill is reinserted into the hole, its dull cutting edges again produce chip-relief action; and the drill is again withdrawn and reinserted.

This chip-relief withdrawal and reinsertion is continually repeated; and warns the operator that the drill is too dull for use.

It should be noted however, that even during the above repeated operations, the drill is never stressed to its breaking point.

Tool-load control mechanization

Figure 4:
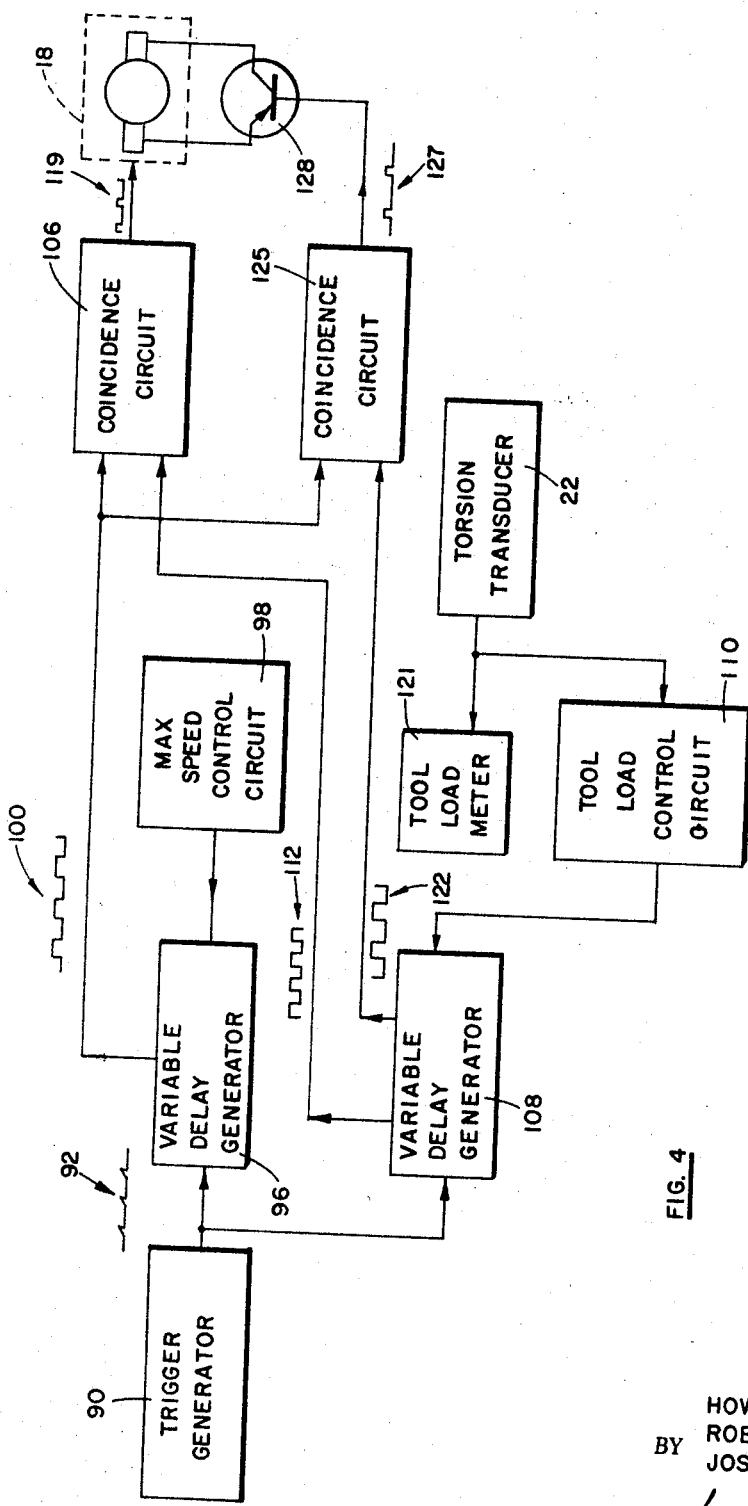
FIGURE 4 shows exemplary circuitry for controlling the tool load.

The previously described spindle-motor speed-control circuit of FIGURE 1 may comprise a circuit such as is shown schematically in FIGURE 4. Here a "trigger signal" source 90 produces a trigger signal waveform 92, shown enlarged in FIGURE 5A; the trigger signals themselves being indicated by reference characters 94A, 94B, 94C, etc., these trigger signals appearing at any convenient rate, such as one hundred times per second. FIGURE 4 shows that the trigger signals are applied to a device such as a variable-delay generator 96.

It will be helpful to know that a variable-delay circuit has one "stable" state in which it will remain indefinitely; is "flipped" by a suitable trigger signal, such as 94, to an unstable state; and after a controllable delay interval, "flops" back to its original stable state.

Variable-delay generator 96 is used to set the maximum speed at which the spindle motor 18 is to operate. This result is achieved by using a maximum-speed-control circuit 98, which may comprise a potentiometer to produce a desired voltage that is applied to variable-delay generator 96 to control the delay thereof.

Figure 5A:
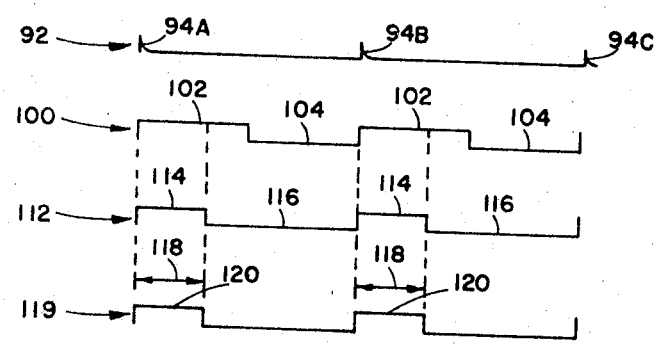
FIGURE 5 shows electrical waveforms associated with the tool-load-control circuitry.

The operation of circuit 96 is as follows. The first trigger signal (94A of FIGURE 5A) flips the generator to its unstable state. The output waveform generator is indicated in FIGURE 5A by reference character 100; the upwardly-extending, or "positive-going" portion 102 of waveform 100 being the output while generator 96 is in its unstable state. After a delay interval controlled by the signal from the maximum-speed-control circuit 98, the generator resumes its original stable state; the output during this stable-state interval being indicated by the downwardly extending or "negative-going" portions 104 of waveform 100.

The next trigger signal, 94B, again flips the generator to its unstable state; and the above-described operation is cyclically repeated.

It may be seen that the maximum-speed-control circuit directly controls the duration of the positive-going portions 102.

The positive-going portion 102 of waveform 100, is used—by means to be described later—to drive spindle motor 18; and, since the duration of the positive-going driving portion 102 is controlled by the maximum-speed-control circuit 98, this circuit presets the maximum speed of the spindle motor.

Thus, the operation of the described circuitry is such as to place an upper limit upon the speed of rotation of the spindle motor 18, and thus preset the maximum speed of the drill. This is desirable in order to prevent tool breakage due to its entering the workpiece at an excessive speed.

The effect of tool load, as obtained from the torsion transducer is as follows. Referring again to FIGURE 4, the trigger signals from trigger signal source 90 are also applied to a second variable-delay generator 108, that controls the drill's instantaneous speed in accordance with the instantaneous tool load. Generator 108 operates in the previously described manner; namely, it has one stable state, but may be flipped to an unstable state for a predetermined interval of time, after which it flops back to its original stable state.

In operation, generator 108 is triggered into its unstable state by the trigger signal 94 from the trigger signal generator 90, and is returned to its stable state after a delay interval controlled by the signal from the torque transducer 22, as modified by tool-load-control circuit 110.

The output of generator 108 is a waveform indicated by reference character 112 of FIGURE 5A. Its unstable-state output is the positive-going portions 114 of waveform 112; and after a delay interval, its stable-state output becomes the negative-going portions 116 of waveform 112.

Tool load control circuit 110 may comprise a potentiometer whose output is a selectable portion of the transducer signal. If a high tool-load is permissible, circuit 110 is set so that its output is the entire transducer signal. This unmodified large signal produces a long delay, and increases the duration of the positive-going portions 114 of waveform 112.

For a low permissible tool-load, circuit 110 is set so that its output is a small fraction of the transducer signal. Thus, the resultant small modified transducer signal decreases the duration of positive-going portion 114 of waveform 112.

The operation is such that if the drill were rotating in air, control waveform 112 would be exactly the same as driving waveform 100. FIGURE 5A shows a situation wherein an appreciable tool load has decreased the duration of the positive-going portions 114, so that the positive-going portions 114 of waveform 112 are of shorter duration than the positive-going portions 102 of waveform 100.

The output of generator 108 as represented by waveform 112, is used—by means to be described later—to control the instantaneous speed of spindle motor 18.

As shown in FIGURE 4, the outputs of generators 96 and 108 are applied to a "coincidence" circuit such as an "AND" gate 106, whose operation is such that it produces an output signal only when two signals applied thereto are both present in a positive-going form.

It will be noted that the outputs of generators 96 and 108 (waveforms 100 and 112 of FIGURE 5A) are both positive-going for an interval of time indicated by reference character 118. Therefore, during the interval 118, the positive-going portion 102 of waveform 100, and the positive-going portions 114 of waveform 112 are both present at coincidence circuit 106; and it therefore produces an output driving waveform 119, as shown in FIGURE 5A. The output driving waveform 119 of coincidence circuit 106 is applied to spindle-motor 18; and the positive-going driving portions 120 of waveform 119 cause spindle-motor 18 to rotate, these positive-going portions being the spindle-motor driving-pulses.

It will be seen from the above explanation that spindle-motor 18 is driven for an interval of time determined by the coincidence of the positive-going portions 102 and 114 of waveforms 100 and 112 respectively. As previously indicated, if there is no tool load these two waveforms are the same, and the actual speed of spindle-motor 18 is a maximum preset value controlled by the setting of the maximum-speed-control circuit 98. As the tool load increases, the instantaneous speed of spindle-motor 18 is established by the driving pulse, controlled by the output of torsion transducer 22 as modified by the setting of tool-load-control circuit 110.

If a very fine drill is being used, tool-load-control circuit 110 is adjusted so that only a short-duration positive-going portion 114 is produced; whereas with a stronger drill, tool-load-control circuit 110 is adjusted so that the positive-going portions 114 may be longer. In this way a stronger drill may operate at a higher drill speed, and thus at a higher tool load.

The tool load meter 121 of FIGURE 4, receives a signal representing the output of the torsion transducer 22. If the torsion bar were identical with the drill, meter 121 would indicate the true tool load; and could have a scale calibrated in that way. If the torsion bar were stronger, or weaker, than the drill being used, another scale, suitably calibrated, would indicate the torsion on the bar, or the tool load.

It was previously indicated that spindle-motor 18 should be able to accelerate quickly when the drill's cutting edges encounter a soft spot; should be able to decelerate quickly when the drill's cutting edges encounter a hard spot; and should be able to stop the drill's rotation instantaneously when tool breakage is imminent because of packed chips.

The acceleration is a characteristic of the motor's design; and offers no problem. However, the use of bearings, low inertia, and other factors cause the motor to coast; and therefore deceleration must be imposed upon the motor.

Deceleration is achieved as follows. Instead of permitting the spindle motor to coast between successive positive-going driving pulses 120 of output waveform 119 from coincident circuit 106, the motor is electrically "braked" during the intervals between driving pulses.

It will be recalled that generators such as 96 and 108 have two states; that they flip between these two states; and that one state produces a positive-going signal while the other state produces negative-going signals.

Figure 5B:
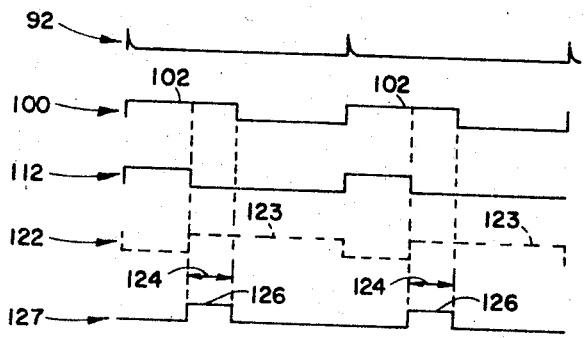

It should be pointed out at this time, that these generators may actually have two output terminals; and that while one terminal produces output signals having the polarity described above, the second output terminal produces output signals having exactly the same duration, but of the opposite polarity. To illustrate, FIGURE 5B is similar to FIGURE 5A, in that it shows trigger waveform 92, the output waveform 100 of generator 96, and the first output waveform 112 of generator 108; but FIGURE 5B also shows, in dotted lines, the second output waveform 122 from generator 108. It will be noted that waveform 122 has a polarity opposite that of waveform 112.

This opposite-polarity waveform 122 is used to "brake" the spindle-motor 18 as follows. FIGURE 4 shows that waveform 100 from generator 96, and the opposite-polarity waveform 122 from generator 108 are both applied to a second coincidence circuit 125. FIGURE 5B shows that part of the positive-going portion 102 of waveform 100 is time-coincident with part of the positive-going portion 123 of the opposite-polarity waveform 122 during the interval 124. The time-coincident portions occurring during interval 124 cause the second coincident circuit 125 to produce positive-going braking pulses 126 shown in braking waveform 127.

These braking pulses 126 activate a braking device, such as a transistor 128, that short-circuits the brushes of spindle-motor 18. As is well known, under this short-circuited condition, motor 18 is braked.

Alternatively, deceleration may be achieved by providing the motor with "recelerating" pulses that cause it to tend to rotate in the opposite direction during intervals 118.

The above explanation has shown that the maximum rotational speed of spindle-motor 18 is controlled by a maximum speed-control adjustment; that the instantaneous speed of spindle-motor 18 is controlled by the tool load; and that the spindle-motor 18 is decelerated between driving signals. In this way the previously-described tool load concept is used to prevent stressing the drill to the point where it might break; while the braking concept of the spindle-motor permits instantaneous changes in speed.

*Feed-drive-concept mechanization*

As was previously indicated, it is necessary to securely correlate the drill's feed with its rotation; yet avoid inertial effects. The present invention accomplishes this results electronically, as shown in FIGURE 6.

The bursts of light produced by the rotating chopper disc 60 impinge upon respective light detectors 74–82, which in turn produce electrical pulses that may, if desired, traverse amplifiers (not shown) in order to strengthen them. As previously explained, the electric pulses produced by light detector 74 indicate the speed of the drill.

In order to control the speed of the feed motor, the pulses from the light detectors are applied to a mutually exclusive selecting-switch assembly 130. This assembly has the characteristic that only one of the switches 132–138 may be closed at a time; the same manner of operation as a pushbutton radio.

If one of the switches 132–138 is closed, the pulses from a selected light detector 76–82 are applied to a feed-control arrangement that comprises a frequency-divider, such as a plurality of series-connected "bistable" flip-flops 140–146. Their respective outputs are applied to a second mutually execlusive selecting-switch assembly 148, comprising switches 150–158 connected to the outputs of respective flip-flop circuits 140–146.

A "bistable" flip-flop circuit is one that has two stable states; remains in either state until a suitable trigger signal causes it to flip to the other state; and remains in this other state until another suitable trigger signal causes it to flop back to the first state.

Figure 7:
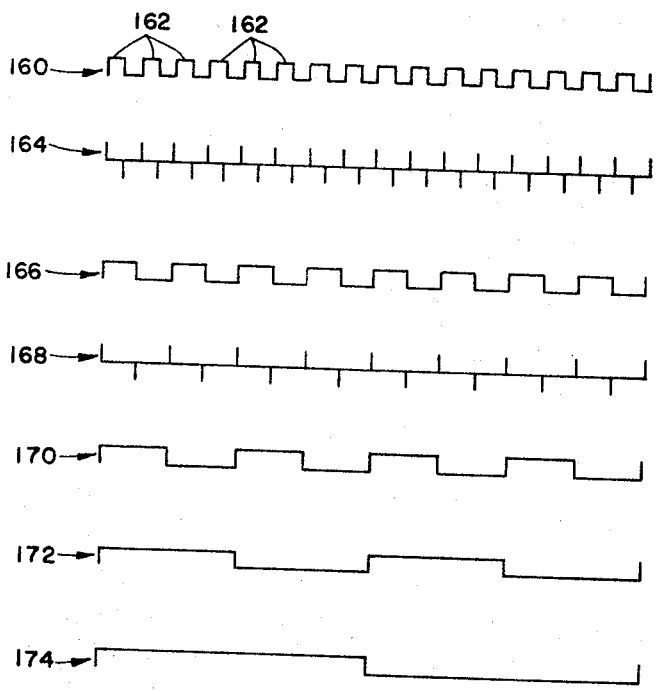
FIGURE 7 shows electrical waveforms associated with the tool-feed-control circuitry.

The operation of the feed-motor speed-control arrangement will be understood from FIGURE 7. Here the positive-going pulses of waveform 160 represent the electrical signals from a light detector. It will be noted that each positive-going pulse 162 starts with an upwardly-extending "leading" edge, and ends with a downwardly extended "trailing" edge. For convenience the leading and trailing edges only are shown in waveform 164.

The bistable flip-flops 140–146 are triggered by only the positive-going edges of the pulses from the immediately preceding circuitry. Thus, each positive-going edge of waveform 164 causes flip-flop 140 to assume another state. The output of flip-flop 140 is shown by waveform 166; while waveform 168 shows only the edges of waveform 166.

Waveform 170 shows the output of the next flip-flop, 142; and waveforms 172 and 174 show the outputs of the subsequent flip-flops 144 and 146 respectively, the edge waveforms having been omitted.

If one positive-going pulse and one negative-going pulse are defined as one cycle, it will be seen that the waveforms 160, 166, 170, 172, and 174 produce sixteen, eight, four, two, and one cycles, respectively. Thus, the number of pulses provided by selector-switch assembly 130 of FIGURES 6 to the feed control arrangement may be divided by 16, 8, 4, or 2; or may be used directly, by closing a particular switch of selector-switch assembly 148.

If desired, the above-described frequency-dividing circuit may be replaced by one that divides by 2, 3, 4, 5, etc.; or by one that divides by 10, 100, etc. Moreover, the frequency of the signals obtained from the light-detectors may be multiplied, rather than divided; so that the term "frequency modification" is to be construed in this broad sense.

It will be recalled that the feed motor is of the stepping type that advances one step for each pulse applied to it; so that by using the above circuitry to control the number of pulses applied to the stepping motor, its speed—that is, the number of steps it advances for each revolution of the chopper disc—can be controlled.

The overall operation of the feed-motor speed-control is as follows. If switches 132 and 150 of FIGURE 6 are closed, thirty-four electrical pulses from light detector 76 pass directly to point 176 for each revolution of chopper disc 60.

If switch 152 is now closed, the previously closed switch 150 opens, and the electrical signals from light detector 76 are applied to the first bistable flip-flop circuit 140. As explained above, the inherent operation of this flip-flop circuit is to divide the number of applied pulses by two; and now half of the applied pulses pass through switch 152 to point 176. Thus, instead of thirty-four pulses per revolution of the chopper disc, only seventeen pulses are produced at point 176.

If a lower feed rate is desired, switch 154 is closed. The signals from light detector 76 now pass through flip-flops 140 and 142, and switch 154. The net result is division by four; and of the thirty-four pulses produced, only eight and a half are applied to point 176.

The two other flip-flops 144 and 146 divide the number of pulses by eight and sixteen respectively, so that closing switches 156 or 158 produces an even smaller number of pulses at point 176.

If the third hole circle, 66, of the chopper disc is used by closing switch 134, it provides forty rather than thirty-four electrical pulses per revolution of the chopper disc. These forty pulses may be applied through switches 134 and 150 directly to point 176; or, if desired, may be stepped down by ratios of one-half, one-fourth, one-eighth, or one-sixteenth, by closing selected switches of the second selector-switch assembly 148.

The other two sets of holes produce 48 and 50 pulses respectively; and these may also be stepped down by the above-mentioned ratios.

Since the number of pulses applied to the stepping motor controls its speed, it may thus be seen that by closing selected switches of switch assemblies 130 and 148, the rotational speed of the feed motor and the feed screw may be closely controlled with reference to the drill's speed.

The exemplary illustration given above permits the drive screw to rotate from a maximum speed to a lower speed that is equal to about one-thirteenth of the maximum speed. Many intermediate feed rates can be achieved by closing selected switches; and of course, other numbers of switches and flip-flops can be used.

It has been found that presently-available stepping motors do not have as high a step rate as is desired; whereas electrical pulses can be produced at almost any desired frequency. To provide an extended feed range for the feed screw, two stepping motors may be used; and electrical pulses are provided at point 176 at twice the frequency required for each motor.

As shown in FIGURE 6, the pulses at point 176 are applied to circuitry 180 comprising a suitable flip-flop that changes its state on the occurrence of either a positive-going edge or a negative-going edge. As a result, the first edge of a pulse that appears at point 176 causes circuit 180 to produce, at one output terminal, an output signal that is applied to feed motor 46A; which thereupon rotates one step.

The next edge that appears at point 176 causes circuit 180 to produce, at its other output terminal, an output signal that is applied to the other feed motor 46B; which thereupon rotates one step. Thus, each individual pulse at point 176 causes each stepping motor 46A and 46B to rotate one step.

As shown in FIGURE 6, the outputs of the two stepping motors 46A and 46B are summed by a mechanical differential 182. The normal operation of a differential is well known, but the present operation is somewhat different. The output of motor 46A is applied through spur gears 184 and 186 to the bevel gear 188 of the differential; while the output of motor 46B is applied through suitable gearing to the spider 190 of the differential.

In operation, a pulse at point 176 causes the first feed motor 46A to rotate one step, and this first step of feed motor 46A causes the differential's output shaft 192 to rotate feed screw 44. While the first feed motor 46A is recovering, the same pulse at point 176 causes the second feed motor 46B to rotate one step, and this first step of the second feed motor 46B causes the differential's output shaft 192 to again rotate the feed screw. Thus, for a single pulse at point 176, each feed motor has advanced one step; and the feed screw has advanced the equivalent of two steps. In this way the speeds of the motors are summed, while each step of each feed motor provides its complete full-strength torque.

*Chip-relief-concept mechanization*

It was previously indicated that chip relief was accomplished by causing the drill to be withdrawn and then reinserted into the hole.

It should be noted that when the drill is withdrawn from the hole, a few partly cut chips remain at the bottom of the hole. If the drill were to be reinserted its full distance, it would "bottom" in the hole, and the rotating cutting edges of the drill would suddenly engage the attached portions of the partly cut chips. Under this condition, the tool load would increase suddenly, and ordinarily would produce drill breakage.

To avoid this possibility, when the drill is reinserted into the hole, it is not inserted the full distance, but instead stops short of the bottom of the hole. The drill is now fed forward, and its cutting edges gradually engage the cut portions of the partly cut chips. These pass outward through the now-clear flutes, before the dense material of the workpiece is reengaged by the cutting edges of the drill. The method of accomplishing this will be understood from the composite drawing of FIGURE 8.

The previously described rotational-rate device 84 may be a tachometer that has two pointers; one of which indicates the instantaneous speed of the drill, and the other of which may be set at the drill speed corresponding to the lowest acceptable cutting efficiency. When the drill-speed-indicating pointer drops to the same value as the preset pointer, the tachometer produces a chip-relief-actuating signal. (This operation is similar to that of the thermostat that controls a furnace or an air-conditioner.)

Alternatively, the chip-relief-actuating signal may be produced electronically. To do this, the rotational-rate device 84 may be circuitry that compares the frequency of the signals from the chopper disc, with signals from an adjustable oscillator. As soon as the frequency of the chopper-disc signals fall below the frequency of the signals from the preset oscillator, the circuitry produces a chip-relief-actuating signal.

Referring now to FIGURE 8, it will be seen that feed-screw 44 actually engages a threaded member 194 that is part of a feed-block 196. Feed-block 196 contains a hydraulic cylinder 198 that has therein a movable piston 200, whose piston rod 202 is fastened to the housing 40; the piston 200 being held, by hydraulic fluid, at the forward end of cylinder 198.

During normal operation, rotation of the feed screw 44 causes the threaded member 194 to move forward. Its forward motion advances the feed-block 196 and the piston 200; thus advancing the housing 40 and the drill 14.

When the rotational-rate device produces a chip-relief-actuating signal, this signal activates a hydraulic mechanism that instantaneously pumps fluid into the cylinder 198 in front of piston 200. Since the feed-block 196 and the cylinder 198 are engaged by the threads of the feed screw 44, they cannot move; and therefore the piston 200 quickly moves backwards about two inches; thus quickly retracting housing 40, and withdrawing the drill 14 from the hole for chip relief.

Simultaneously, the chip-relief-actuating signal reverses feed drive motors 46, so that the feed screw 44 rotates backwards for about a quarter of a revolution. This feed motor reversal is accomplished by using the chip-relief-actuating signal to activate circuitry that applies a given number of pulses from the light detector in such a manner that the feed motors rotate backwards. Alternatively, pulses from a suitable pulse generator may be used.

At the completion of drill withdrawal, the hydraulic mechanism pumps fluid into cylinder 198 behind piston 200. The piston advances in cylinder 198, advancing the housing 40, and reinserting the drill into the hole. However, due to the fact that the feed screw has backed off about a quarter of a turn, the drill does not bottom in the hole. At the completion of drill reinsertion, the feed mechanism advances the drill in a positive feed manner, and the cutting edges of the drill now engage the partly cut chips at bottom of the hole in the optimum cutting manner.

MISCELLANEOUS OPERATIONS

When the drill has advanced a perdetermined distance, and has finished the drilling operation, a preset switch produces an end-of-drilling signal that reverses the direction of rotation of the feed motor and feed screw to completely withdraw the drill from the hole, and repositions the drill at its starting point. If desired, the end-of-drilling signal may also engage a fast clutch 210, coupled between the output shaft of the differential 182 and the feed screw 44, to return the drill to its starting point to the shortest possible time.

In a similar manner, when the drilling operation is initiated, a start signal may engage the fast clutch, so that the drill is fed forward at its most rapid feed rate, to a position just shy of the point where the drill actually engages the workpiece.

Once the drill has reached this point, a slow clutch 212—coupled by gears and a driving belt between the output shaft of the differential and the feed screw—may be engaged to provide the desired preset positive feed.

The fast speed may be achieved by using the bursts of chopped light from the rapidly rotating chopper disc; or alternatively, in those cases where the drill has been preset to a relatively low maximum speed, a suitable pulse generator may be used to supply pulses that rotate the feed motor at its highest possible speed.

It will be understood that the disclosed principles can be achieved in other ways than those described. For example, the positive-going pulses can be replaced by negative-going pulses; the positive-going edges can be replaced by negative-going edges; the coincidence circuits may be replaced by other types of logic circuitry; the flip-flops can be replaced by other types of monostable and bistable circuits, etc.

It is to be further appreciated that the concept of the disclosed principles of the invention provide automatic means for controlling a tool; such automatic control means comprising first means for measuring the torque load on said tool, second means responsively connected to the first means for controlling the cutting speed of the tool, and third means responsive to the controlled speed of the tool for controlling the feed rate thereof. In the normal operation of the arrangement, the second means cooperates with the first means to limit the maximum torque load imposed upon the tool, and the third means coperates with the second means to increase and decrease the feed rate of the tool in accordance with a respective increase and decrease of the controlled speed of the tool, the third means reversing the feed rate when the rotational speed of the tool drops below a preselected minimum speed.

While the foregoing explanation has been presented in terms of a drill, it is to be realized that tools such as side mills, end mills, and the like may be used. These are cutting tools whose cutting edges may be parallel or perpendicular to their axis of rotation; but the problems of tool load, tool dulling, tool breakage, tool feed, chip relief, etc., are similar—differing more in degree rather than type.

Hence, the concept of the invention generally discloses automatic apparatus for controlling a cutting tool, comprising first means for measuring the tool load, second means responsively connected to the first means for controlling the cutting speed of the tool, and third means responsive to the controlled speed of the tool for controlling the feed rate of the cutting tool.

Although the invention has been illustrated and described in detail, it is to be clearly understood that the same is by way of illustration and example only, and is not to be taken by way of limitation; the spirit and scope of this invention being limited only by the terms of the appended claims.

We claim:
1. The combination comprising:
  means for rotating a tool;
  means, comprising a torsion bar connected in tandem with said tool, and a torsion transducer connected to indicate the twist of said torsion bar at every instant, for obtaining an indication of the tool load at every instant;
  means for adjusting the tool load in accordance with said indication, said means comprising means for causing the output of said transducer to control the speed of the tool-rotating means;
  a chopper disc operatively associated with said tool-rotating means;
  means, comprising said chopper disc, for producing electrical signals whose frequency is indicative of the tool speed;
  means for feeding said tool; and
  means for applying said electrical signals to said tool-feeding means, to correlate the tool feed with the tool rotation.

2. The combination comprising
    means for rotating a tool;
    means for obtaining an indication of the tool load;
    means for adjusting the tool load in accordance with said indication;
    a chopper disc operatively associated with said tool-rotating means;
    means, comprising said chopper disc, for producing pulse-like electrical signals whose frequency is indicative of the tool speed;
    means for feeding said tool;
    means for applying said pulse-like electrical signals to said tool-feeding means;
    means for measuring the instantaneous cutting efficiency of said tool; and
    means for retracting said tool when the instantaneous cutting efficiency drops below the minimal acceptable cutting frequency.

3. In combination with a tool having a permissible tool load, the combination comprising
    means, comprising a torsion bar, for obtaining an indication of the instantaneous tool load;
    means, operatively associated with said torsion bar, for producing an electrical signal corresponding to said indication;
    means for causing said signal to keep the tool load below said permissible tool load;
    means, comprising a chopper disc operatively associated with said tool-rotating means, for producing pulse-like electrical signals whose frequency is indicative of the tool speed;
    means for dividing said frequency in a predetermined manner, said means comprising a plurality of series-connected bistable flip-flops;
    stepping-type feed motor means for feeding said tool;
    means for applying said frequency-divided pulse-like electrical signals to said motor means;
    means, comprising said chopper disc, for measuring the instantaneous rotational rate of said tool;
    means for establishing a minimal desired rotational rate of said tool;
    means for producing an actuating signal when the instantaneous rate falls below said minimal desired rate;
    means for retracting said tool; and
    means for causing said actuating signal to activate said tool-retracting means.

4. In combination with a tool having a permissible tool load, the combination comprising
    means, comprising a torsion bar, for obtaining an indication of the instantaneous tool load;
    means, operatively associated with said torsion bar, for producing an electrical signal corresponding to said indication;
    means for causing said signal to keep the tool load below said permissible tool load;
    means, comprising a chopper disc operatively associated with said tool-rotating means, for producing pulse-like electrical signals whose frequency is indicative of the tool speed;
    means for dividing said frequency in a predetermined manner, said means comprising a plurality of series-connected bistable flip-flops;
    a flip-flop circuit;
    means for applying said pulse-like electrical signals from said frequency-dividing means to said flip-flop—whereby said flip-flop produces two pulse-like outputs for each pulse-like input;
    a differential having a first bevel gear defining a first input, a pinion gear defining a second input, and a second bevel gear defining an output;
    a first step motor;
    a second step motor;
    means for applying the output of said first motor to said first bevel gear;
    means for applying the output of said second motor to said pinion gear; and
    means for taking the summed output of said motors from said second bevel gear;
    a rotatable feed screw;
    means for coupling said feed-screw to said second bevel gear;
    means for applying said pulse-like outputs from said flip-flop alternately to saidf first and second step motors—whereby respective said outputs causing respective said step motors to advance one step, and causes said feed screw to advance two steps;
    means, comprising said chopper disc, for measuring the instantaneous rotational rate of said tool;
    means for establishing a minimal desired rotational rate of said tool; and
    means for producing an actuating signal when the instantaneous rate falls below said minimal desired rate.

5. In combination with a tool having a permissible tool load, the combination comprising
    means, comprising a torsion bar, for obtaining an indication of the instantaneous tool load;
    means, operatively associated with said torsion bar, for producing an electrical signal corresponding to said indication;
    means for causing said signal to keep the tool load below said permissible tool load;
    means, comprising a chopper disc operatively associated with said tool-rotating means, for producing pulse-like electrical signals whose frequency is indicative of the tool speed;
    means for dividing said frequency in a predetermined manner, said means comprising a plurality of series-connected bistable flip-flops;
    a flip-flop circuit;
    means for applying said pulse-like electrical signals from said frequency-dividing means to said flip-flop—whereby said flip-flop produces two pulse-like outputs for each pulse-like input;
    a differential having a first bevel gear defining a first input, a pinion gear defining a second input, and a second bevel gear defining an output;
    a first step motor;
    a second step motor;
    means for applying the output of said first motor to said first bevel gear;
    means for applying the output of said second motor to said pinion gear; and
    means for taking the summed output of said motors from said second bevel gear;
    a rotatable feed screw;
    means for coupling said feed screw to said second bevel gear;
    means for applying said pulse-like outputs from said flip-flop alternately to said first and second step motors—whereby respective said outputs causing respective said step motors to advance one step, and causes said feed screw to advance two steps;
    means, comprising said chopper disc, for measuring the instantaneous rotational rate of said tool;
    means for establishing a minimal desired rotational rate of said tool;
    a housing, containing said tool for engaging a workpiece adapted to move along a way;
    a feed block, having a cylinder therein, adapted to move along said way;
    a piston, attached to said housing, and movably positionable in said cylinder;
    means, comprising said feed screw threadedly engaged with said feed block, for moving said feed block along said way;
    means for holding said piston at one location of said cylinder—whereby rotation of said feed screw causes simultaneous movement of said feed block and said housing along said way; and means, activated by a low rotational rate of said tool, as indicated by said rotational-rate measuring means, for moving said piston in said cylinder—whereby said movement of said piston causes said tool to be disengaged from said workpiece.

6. In combination with a cutting tool, the combination comprising:
   means, comprising a tool-driving device, for obtaining a true electrical indication of the tool load at every instant; and
   means for continuously adjusting the tool load in accordance with said indication from said tool-driving device.

7. In combination with a cutting tool, the combination comprising:
   means, comprising a tool-driving device, for driving said cutting tool, and for obtaining an electrical indication of the tool load at every instant; and
   means for causing said electrical indication from said device to continuously adjust the tool-driving device in accordance with said electrical indication.

8. In combination with a rotatable cutting tool, the combination comprising:
   means, comprising a mechanical tool-driving and torsion-indicating arrangement, for producing a single electrical signal that is an indication of the tool load at every instant; and
   means for causing said single electrical signal from said torsion-indicating arrangement to continuously adjust said driving device's rotational rate in accordance with said single electrical signal from said torsion-indicating arrangement.

9. In combination with a motor-driven tool having a permissible tool load, the combination comprising:
   means for producing a first train of electrical signals that are an indication of the tool load at every instant;
   means for causing said train of electrical signals to produce a second train of electrical signals that vary in accordance with said permissible tool load; and
   means for using said second train of electrical signals for adjusting the rotational rate of said tool-driving motor to maintain the instantaneous tool load below the permissible tool load.

10. In combination with a tool having a permissible tool load, and a motor for rotating said tool, the combination comprising
    means, comprising a torsion bar connected in tandem with said tool and a torsion transducer connected to said torsion bar to measure the twist of said torsion bar, for obtaining a continuous electrical signal indication of the instantaneous tool load as indicated by the twist of said torsion bar; and
    means for continuously controlling the speed of said motor in accordance with said continuous electrical signal indication from said torsion transducer 11. In combination with a motor for rotating a tool, the combination comprising
    means for producing a driving pulse for accelerating said motor and increasing the rotational rate of said tool;
    means for producing a decelerating pulse for decelerating said motor; and
    means for alternately applying said driving and said decelerating pulses to said motor.

12. In combination with a tool having a permissible tool load, and a motor for rotating said tool, the combination comprising
    means for producing driving pulses for said motor;
    means for causing said driving pulses to maintain the speed of said tool below a preset maximum speed;
    means for producing control pulses;
    means for causing said control pulses to modify said driving pulses to maintain the tool load of said tool below said permissible tool load;
    means for producing braking pulses for said motor; and
    means for alternately applying said modified driving pulses and said braking pulses to said motor.

13. The combination comprising
    a differential having a first bevel gear defining a first input, a spider and pinion gear defining a second input, and a second bevel gear defining an output;
    a first step motor;
    means for applying the output of said first motor to said first bevel gear;
    a second step motor;
    means for applying the output of said second motor to said pinion gear, the outputs of said step motors being an alternating sequence; and
    means for taking the alternate outputs of said motors from said second bevel gear.

14. The combination comprising
    a differential having a first bevel gear defining a first input, a pinion gear defining a second input, and a second bevel gear defining an output;
    a first step motor;
    means for applying the output of said first motor to said first bevel gear;
    a second step motor;
    means for applying the output of said second motor to said pinion gear, said outputs being an alternating sequence;
    means for taking the summed output of said motors from said second bevel gear;
    a rotatable feed screw; and
    means for coupling said feed screw to said second bevel gear for causing each step of each said step motors to rotate said feed screw in an intermittent manner.

15. The combination comprising
    a first step motor;
    a second step motor;
    a flip-flop circuit;
    means for applying a pulse-like input to said flip-flop—whereby said flip-flop produces two alternate pulse-like outputs;
    means for applying said alternate pulse-like outputs alternately to said first and second step motors;
    a differential having a first bevel gear defining a first input, a pinion gear defining a second input, and a second bevel gear defining an output;
    means for applying the output of said first motor to said first bevel gear;
    means for applying the output of said second motor to said pinion gear; and
    means for taking the summed output of said motors from said second bevel gear;
    a rotatable feed screw; and
    means for coupling said feed screw to said second bevel gear—whereby each step of each said step motors causes rotation of said feed screw.

16. In combination with a tool-rotating arrangement, the combination comprising
    means for producing input pulse-like electrical signals whose frequency is indicative of the tool speed;
    a flip-flop circuit;
    means for applying said pulse-like electrical signals to said flip-flop—whereby said flip-flop produces two pulse-like outputs for each pulse-like input;
    a differential having a first bevel gear defining a first input, a pinion gear defining a second input, and a second bevel gear defining an output;
    a first step motor;
    means for applying the output of said first motor to said first bevel gear;
    a second step motor;
    means for applying the output of said second motor to said pinion gear; and means for taking the summed output of said motors from said second bevel gear;

a rotatable feed screw;

means for coupling said feed screw to said second bevel gear; and means for applying said alternate pulse-like outputs alternately to said first and second step motors—whereby each pulse-like input signal causes said flip-flop to produce two pulse-like outputs, respective said outputs causing respective said step motors to advance one step, and causes said feed screw to advance two steps.

17. The combination comprising a rotatable tool;

means for measuring the instantaneous cutting efficiency of said tool as indicated by the instantaneous rotational rate of said tool;

means for presetting a minimal acceptable cutting efficiency as indicated by a minimal acceptable instantaneous rotational rate of said tool; and means for producing a signal when the instantaneous cutting efficiency, as indicated by the instantaneous rotational rate of said tool, drops below the minimal acceptable cutting efficiency as indicated by the minimal acceptable instantaneous rotational rate of said tool.

18. The combination comprising a rotatable tool;

means for measuring the instantaneous rotational rate of said tool;

means for establishing a minimal desired rotational rate of said tool;

means for producing an actuating signal when said instantaneous rate falls below said minimal desired rate; and means for causing said actuating signal to retract said tool.

19. The combination comprising a housing, having a rotatable tool for engaging a workpiece, adapted to move along a way;

means for measuring the instantaneous rotational rate of said tool;

a feed block, having a cylinder therein, adapted to move along said way;

a piston, attached to said housing, and movably positionable in said cylinder;

means, comprising a feed screw threadedly engaged with said feed block, for moving said feed block along said way;

means for holding said piston at one location of said cylinder—whereby rotation of said feed screw causes simultaneous movement of said feed block and said housing along said way;

means for establishing a minimal desired rotational rate of said tool;

means for producing an actuating signal when the instantaneous rotational rate falls below said minimal desired rate; and means for causing said actuating signal to initiate movement of said poston in said cylinder—whereby said movement of said piston may cause said tool to be disengaged from said workpiece.

20. The combination comprising a housing, having a rotatable tool for engaging a workpiece, adapted to move along a way;

means for measuring the instantaneous rotational rate of said tool;

a feed block, having a cylinder therein, adapted to move along said way;

a piston, attached to said housing, and movably positionable in said cylinder;

means, comprising a feed screw threadedly engaged with said feed block, for moving said feed block along said way;

means for holding said piston at one location of said cylinder—whereby rotation of said feed screw causes simultaneous movement of said feed block and said housing along said way; and means, activated by a low rotational rate of said tool, as indicated by said rotational-rate measuring means, for moving said piston in said cylinder—whereby said movement of said piston causes said tool to be disengaged from said workpiece.

21. Automatic apparatus for controlling a cutting tool comprising tool-load measurement means for producing an electrical signal indicative of the tool load at every instant;

second means, responsive to said electrical signal from said measurement means, for controlling the rotational speed of said tool; and third means, responsive to said controlled speed, for controlling the feed rate of said tool.

22. Automatic apparatus for controlling a cutting tool comprising first means for measuring the torque load upon said tool, said means comprising a tool-rotating torsion bar connected in tandem with said tool, and torsion-transducer means operatively associated with said torsion bar for producing electrical signals indicative of the torque load on said tool at every instant;

second means, responsively connected to said electrical signals from said first means, for controlling the rotational speed of said tool; and third means, responsive to said controlled rotational speed, for controlling the feed rate of said tool.

23. The device of claim 22 in which said second means cooperates with said first means for limiting the maximum torque generated by said tool.

24. The device of claim 22 in which said second means cooperates with said first means for limiting the maximum torque generated by said drill and in which said third means cooperates with said second means to reverse the feed rate when said rotational speed decreases to a preselected minimum speed.

25. A stepping motor drive for moving a part in response to a single primary train of electrical pulses, said drive comprising a plurality of stepping motors each having a rotatable output member and being of the pulse responsive type wherein said output member is moved by a given angular displacement in response to each pulse applied thereto, a summing differential drive mechanism having a plurality of rotatable input members each drivingly connected with a respective one of the output members of said stepping motors and also having a rotatable output member drivingly connected with said part, means coupled with the source of said single primary train of pulses which means is operable to transform said single primary train of pulses into a plurality of secondary trains of pulses, each of which secondary trains contains a number of pulses proportionaly related to the number of pulses in said primary train, and means for transmitting each of said secondary trains of pulses to a respective one of said stepping motors with the result that the output member of each stepping motor is driven at a slower speed than would be obtained by directly applying said primary train of pulses thereto.

26. A stepping motor drive for moving a part in response to a single primary train of electrical pulses, said drive comprising a plurality of stepping motors each having a rotatable output member and being of the pulse responsive type wherein said output member is moved by a given angular displacement in response to each pulse applied thereto, a summing differential drive mechanism having a plurality of rotatable input members each drivingly connected with a respective one of the output members of said stepping motors and also having a rotatable output member drivingly connected with said part, means coupled with the source of said single primary train of pulses which means is operable to transform said single primary train of pulses into a plurality of secondary trains of pulses each of which secondary trains contains a number of pulses proportionally related to and less than the number of pulses in said primary train, and means for transmitting each of said secondary trains of pulses to a respective one of said stepping motors with the result that the output member of each stepping motor is driven at a slower speed than would be obtained by directly applying said primary train of pulses thereto.

27. A stepping motor drive for moving a part in response to a primary train of electrical pulses, said drive comprising a plurality of stepping motors each having a rotatable output member and being of the pulse responsive type wherein said output member is moved by a given angular displacement in response to each pulse applied thereto, a differential drive mechanism having a plurality of rotatable input members each drivingly connected with a respective one of the output members of said stepping motors and also having a rotatable output member drivingly connected with said part, means coupled with the source of said primary train of pulses and with said stepping motors and which means is operable to divide said primary train of pulses into a plurality of secondary trains of pulses each of which secondary trains contains a number of pulses equal to the number of pulses in said primary train divided by the number of stepping motors, and means for transmitting each of said secondary trains of pulses to a respective one of said stepping motors with the result that the output member of each stepping motor is driven at a speed equal to dividing by the number of stepping motors the speed that would be obtained by directly applying said primary train of pulses thereto.

28. A stepping motor drive as defined in claim 27 further characterized by there being two stepping motors and said means for dividing said primary train of pulses into secondary trains of pulses comprising a divide-by-two device.

29. A stepping motor drive for moving a part in response to a primary train of electrical pulses, said drive comprising a plurality of pulse responsive stepping motors each having a rotatable output member which is moved by a given angular displacement in response to each pulse applied thereto, a differential drive mechanism having a plurality of rotatable input members each drivingly connected with a respective one of the output members of said stepping motors and also having a rotatable output member drivingly connected with said part, and means coupled with the source of said train of pulses and with said stepping motors and which means is operable to sequentially distribute pulses to said stepping motors with one pulse being transmitted to one of said stepping motors for each pulse appearing in said train.

30. A stepping motor drive for moving one part relative to another part, said drive comprising means for generating a single primary train of electrical pulses wherein the number of pulses in said train is proportionally related to the desired displacement of said one part relative to said other part, a plurality of pulse responsive stepping motors each having a movable output member which is moved by a given displacement in response to each pulse applied thereto, a mechanical summing device having a plurality of movable input members and one movable output member the displacement of which is a function of the sum of the displacements of said input members, means responsive to said single primary train of pulses for producing a plurality of secondary trains of pulses each of which secondary trains contains a number of pulses proportionally related to the number of pulses in said primary train, and means for transmitting each of said secondary trains of pulses to a respective one of said stepping motors with the result that the output member of each stepping motor is driven at a slower speed than would be obtained by directly applying said primary train of pulses thereto.

31. The combination comprising:
a motor;
a tool-driving member connected to be driven by the motor, and adapted to have a driven tool connected thereto; and
transducer means, connected with the tool-driving member, for generating signals indicative of varying magnitudes of distortion of the tool-driving member under varying tool loads within a predetermined acceptable range of tool loads.

32. In combination with a motor for rotating a tool, the combination comprising:
means, comprising a torsion-bar connected in tandem with said tool, for providing an indication—in the form of a torsion-bar twist—of the tool's torsional distortion over a range of tool loads;
torsion-transducer means, operatively associated with said torsion bar, for producing an electrical signal indicative of the tool's torsional distortion over said range of tool loads; and
means for causing said electrical signal to control said tool's torsional distortion over said range of tool loads.

33. In combination with a motor for rotating a tool, the combination comprising:
means, comprising a torsion bar connected in tandem with said tool and a torsion transducer connected to said torsion bar to measure the twist of said torsion bar, for obtaining an electrical indication of the instantaneous tool load as indicated by the twist of said torsion bar;
means, cooperatively associated with said electrical indication, for producing a driving pulse for driving said motor and said tool;
means for producing a decelerating pulse for decelerating said motor and said tool; and
means for alternatively applying said driving and decelerating pulses to said motor.

34. The combination comprising:
a rotatable tool;
means for measuring the instantaneous rotational rate of said tool;
means for establishing a minimal desired rotational rate of said tool;
means for producing a retracting signal when said instantaneous rotational rate of said tool falls below said minimal desired rotational rate of said tool;
means for causing said retracting signal to retract said tool a given distance, said retraction permitting said tool to accelerate until its instantaneous rotational rate exceeds said minimal desired rotational rate;
means for producing a reinsertion signal when said instantaneous rotational rate of said tool exceeds said minimal desired rotational rate; and
means for causing said reinsertion signal to advance said tool a distance that is slightly less than the retraction distance.

35. The combination comprising:
a motor;
a tool-driving member connected to be driven by the motor, and adapted to have a driven tool connected thereto;
transducer means, connected with the tool-driving member, for generating signals indicative of varying magnitudes of distortion of the tool-driving member under varying tool loads within a predetermined acceptable range of tool-loads, said transducer means comprising a first transducer element associated with one portion of said tool-driving member, and a second transducer element associated with another portion of said tool-driving member, said transducer elements comprising synchro-motors; and
means for producing a load signal corresponding to the angular relation of said transducer elements.

36. The combination comprising:

a motor;

a tool-driving member connected to be driven by the motor, and adapted to have a driven tool connected thereto;

transducer means, connected with the tool-driving member for generating signals indicative of varying magnitudes of distortion of the tool-driving member under varying tool loads within a predetermined acceptable range of tool loads, said transducer means comprising a first transducer element associated with one portion of said tool-driving member, and a second transducer element associated with another portion of said tool-driving member; and means for producing a load signal corresponding to the angular relation of said transducer elements, said load signal controlling the feed rate of said tool.

References Cited

UNITED STATES PATENTS

| | | | |
|---|---|---|---|
| 3,254,543 | 6/1966 | Donath | 77—5.2 |
| 2,978,689 | 4/1961 | Tech et al. | 77—5.2 |
| 3,049,003 | 8/1962 | Felder | 73—136 |
| 3,134,279 | 5/1964 | Sims et al. | 73—136 XR |
| 1,989,187 | 1/1935 | Fitzgerald | 318—39 X |
| 2,010,999 | 8/1935 | Kingsbury | 77—32.1 |
| 2,227,801 | 1/1941 | Trofimov | 74—675 |
| 2,523,503 | 9/1950 | Fairbanks | 318—8 |
| 2,537,427 | 1/1951 | Seid et al. | 77—5.2 |
| 2,774,261 | 12/1956 | Leibing. | |
| 3,051,806 | 1/1962 | Wang et al. | |
| 3,064,173 | 11/1962 | Breen et al. | 318—163 X |
| 3,079,539 | 2/1963 | Guerth | 318—341 X |
| 3,098,889 | 7/1963 | Buitkus | 84—1.28 X |
| 3,136,698 | 6/1964 | Mann | 318—8 |
| 3,146,386 | 8/1964 | Gerber | 318—8 |
| 3,156,150 | 11/1964 | Sarka | 74—675 XR |
| 3,184,663 | 5/1965 | Mergler | 318—39 |
| 3,188,545 | 6/1965 | Sheheen | 318—341 XR |

FOREIGN PATENTS

| | | |
|---|---|---|
| 142,855 | 10/1960 | Russia. |
| 829,824 | 3/1960 | Great Britain. |

FRANCIS S. HUSAR, *Primary Examiner.*

U.S. Cl. X.R.

77—5, 32.7, 33.4, 34.7; 90—21.5; 318—8, 18, 138